United States Patent [19]

Chun

[11] 4,341,058
[45] Jul. 27, 1982

[54] EXERCYCLE MOWER APPARATUS

[76] Inventor: Andrew Chun, 1410 172nd Pl., SW., Alderwood Manor, Wash. 98036

[21] Appl. No.: 231,808

[22] Filed: Feb. 5, 1981

[51] Int. Cl.$^3$ .................................... A01D 53/00
[52] U.S. Cl. .................................... 56/2; 56/255; 272/73
[58] Field of Search .................. 56/255, 249, 13.5, 2; 272/73

[56] References Cited

U.S. PATENT DOCUMENTS

| | | | |
|---|---|---|---|
| 613,834 | 11/1898 | Burnet | 56/249 |
| 1,582,292 | 4/1926 | Mazzocco | 56/255 |
| 1,713,396 | 5/1929 | Rountree | 56/249 |
| 3,630,010 | 12/1971 | Rester | 56/13.5 |

Primary Examiner—Jay N. Eskovitz
Attorney, Agent, or Firm—Frank Frisenda, Jr.

[57] ABSTRACT

In accordance with the present invention, a pedal powered exercycle mower apparatus is provided. In one embodied form, the apparatus comprises a mobile vehicle member having a main supporting frame and a centrally positioned cutting apparatus mounted on the frame at its lower portion for cutting ground cover and the like. The cutting mechanism is driven by a series of gears which translate force from the pedals into rotational movement of cutting blade about a vertical axis transverse to the longitudinal axis of the main supporting frame. The apparatus further includes a plurality of sprocket wheels and a drive chain for apportioning power from the pedals to the cutting mechanism and to directional movement of the apparatus.

5 Claims, 6 Drawing Figures

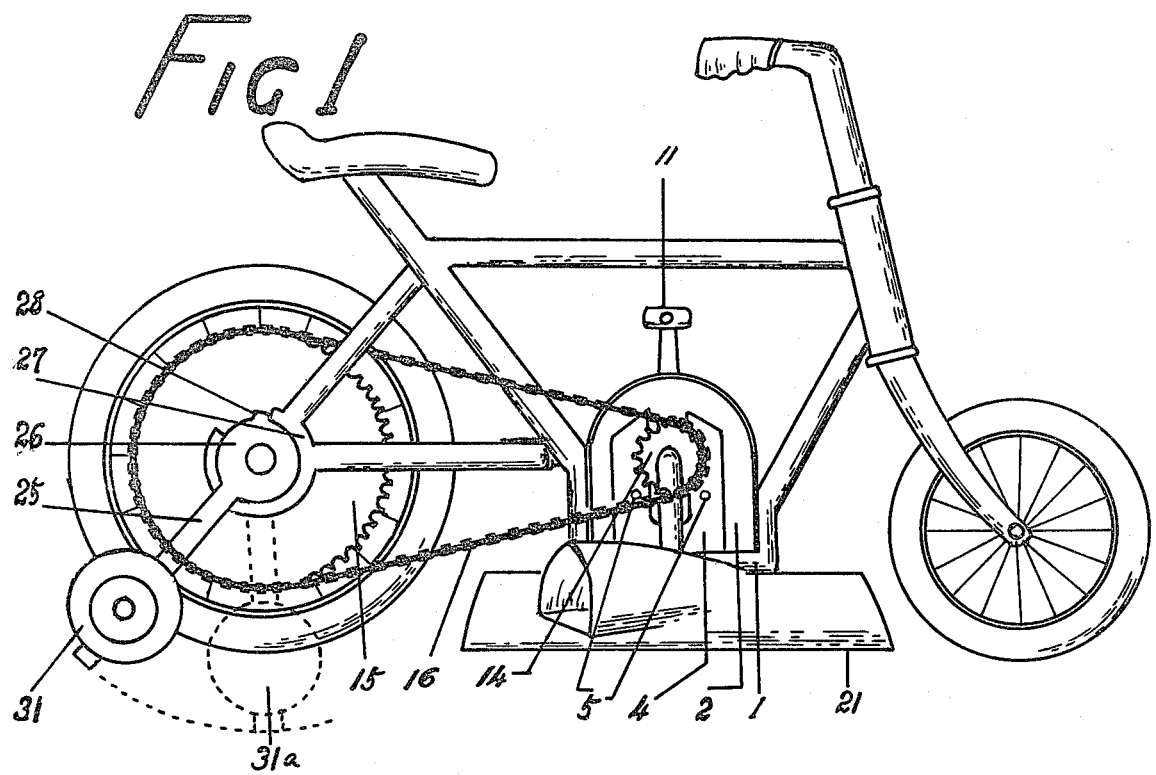
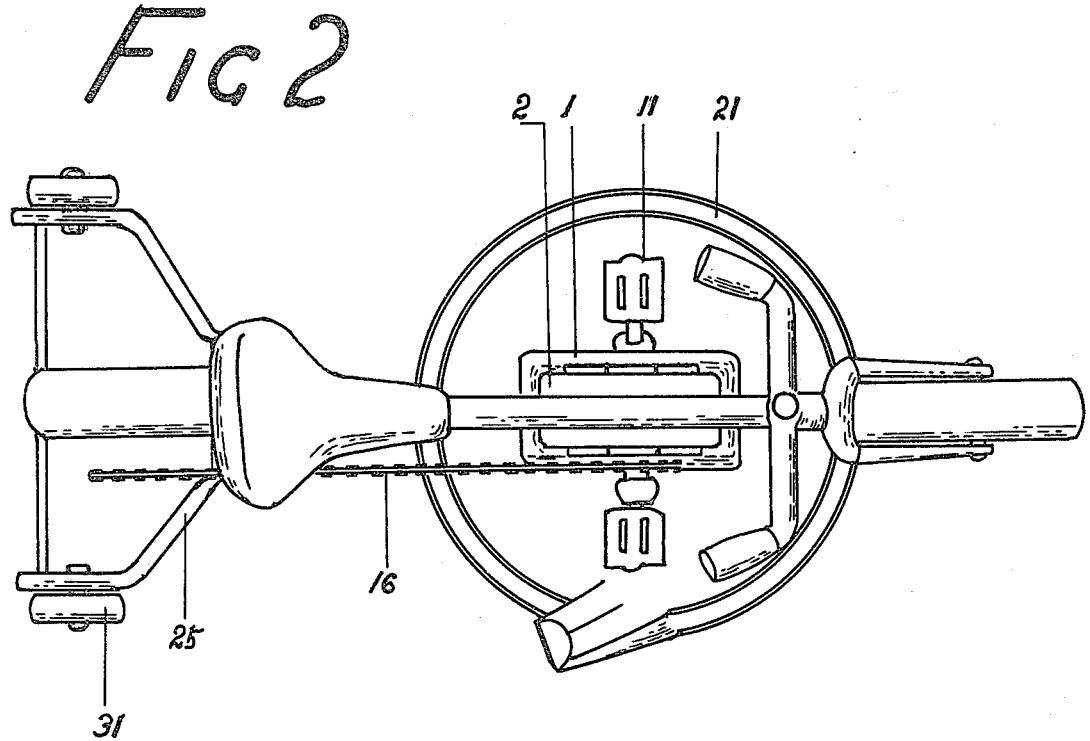

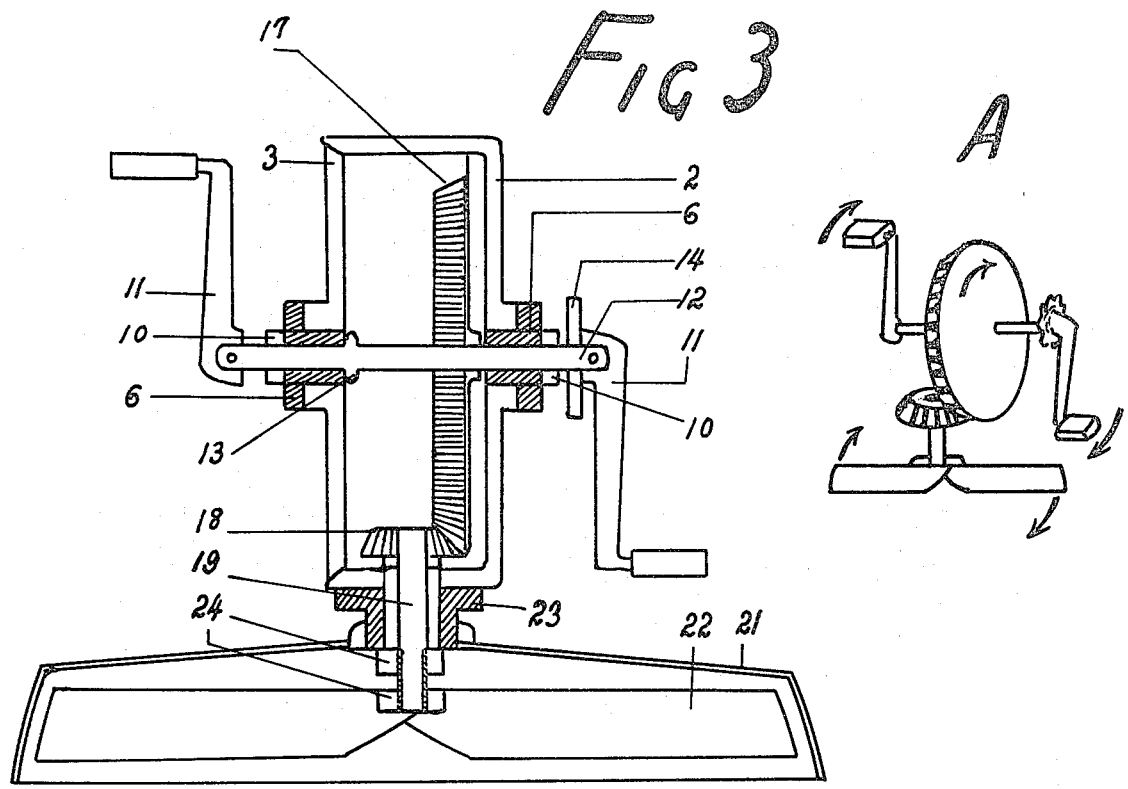
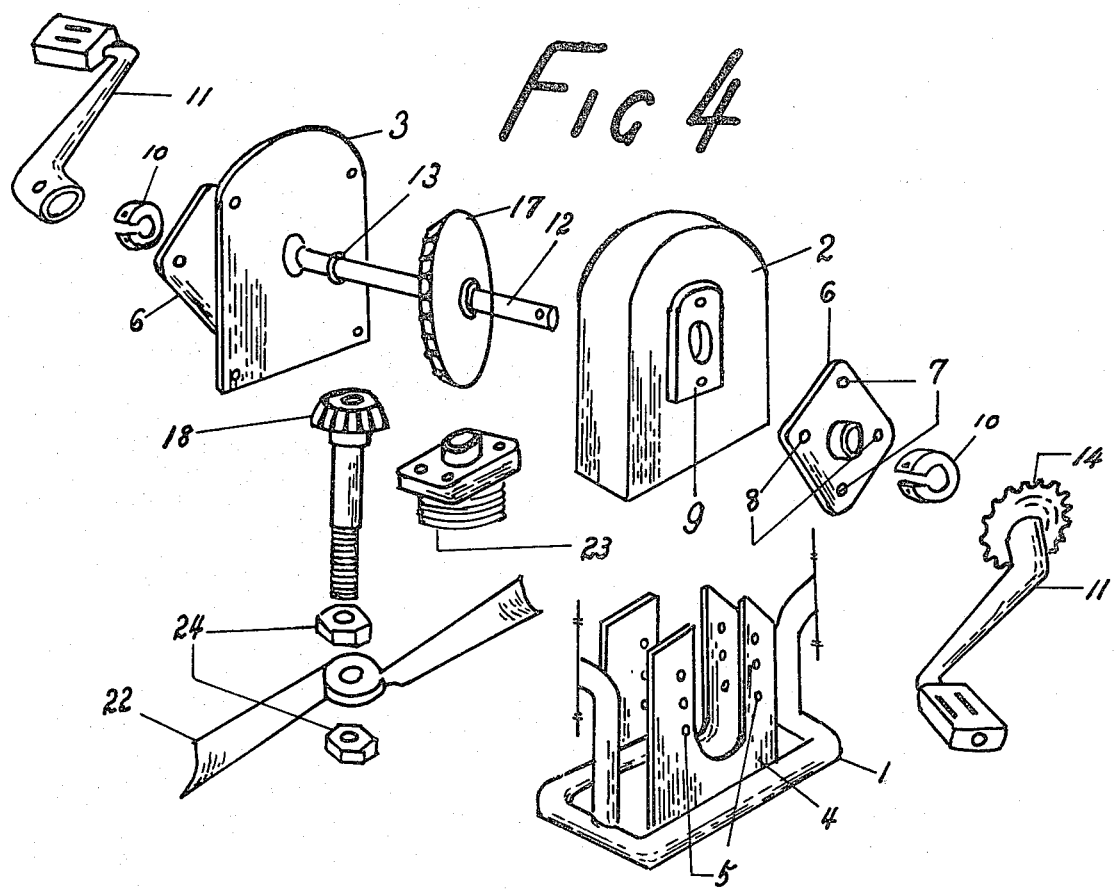

EXERCYCLE MOWER APPARATUS

BACKGROUND OF THE INVENTION

This invention relates to a pedal powered mower apparatus and has particular reference to an apparatus which can be driven by an operator and utilized for the trimming of ground cover, such as grass and the like without the use of fossil fueled engine or electricity.

In a wide number of geographical areas throughout the United States and abroad, it is desirable if not necessary, for home owners and other property owners to maintain grass lawns as well as other ground cover, such a clover and the like. A well manicured lawn is both esthetically pleasing to the eye and can be essential in preventing soil erosion when heavy rain occurs.

Conventional motorized riding lawn mowers, while satisfying the requirement for power, generally have been noisy when operated and provide little, if any, benefits in terms of physical exercise on the part of the operator.

Accordingly, those skilled in the art have recognized a significant need for an apparatus which will do the desired job, that is, trimming ground cover and have a secondary benefit of providing an enjoyable sort of exercise for the operator. Moreover, a need has also been appreciated for an apparatus which is inexpensive to operate and will not contribute to the pollution of the environment both in terms of noise and exhaust gas emissions. The present invention fulfills these needs.

SUMMARY OF THE INVENTION

The present invention provides a pedal powered exercycle mower apparatus for cutting ground cover and the like in an efficient and economical manner, without the use of fossil fueled combustion engine or electricity.

The inventive apparatus comprises, in combination, a mobile vehicle member having a main supporting frame; means for cutting ground cover within a path traversed by the vehicle member, mounted on the supporting frame; a pair of foot pedals mounted on the frame for powering the apparatus by manual rotational movement of the pedals about a horizontal axle-shaft transverse to the longitudinal axis of the supporting frame; and means, mounted on the frame, for apportioning power derived from the rotational movement of the foot pedals to drive the means for cutting ground cover and to drive the apparatus in a forward or rearward direction.

In a presently preferred embodiment, the means for cutting ground cover includes a centrally positioned cutting mechanism provided at a lower portion of the main supporting frame, which is driven by a series of gears translating rotational force from the foot pedals into rotational movement of a plurality of cutting blade about a vertical axis transverse to the longitudinal axis of the frame. The apparatus further comprises a plurality of sprocket wheels interconnected by a drive chain, the first sprocket wheel being relatively smaller than the second rear sprocket wheel for apportioning power derived from rotational movement of the foot pedals.

The preferred mobile vehicle member includes two major wheels, front and rear, and two minor wheels, left and right, one wheel each being provided at the rear of the main supporting frame.

Accordingly, the unique pedal powered exercycle mower apparatus of the present invention is capable of trimming ground cover, such as grass, clover and the like, while at the same time providing an enjoyable source of exercise for the user, without the use of fossil fueled combustion engines or electricity.

Other features and advantages of the present invention will become apparent from the following more detailed description taken in conjunction with the accompanying drawings and claims.

BRIEF DESCRIPTION OF THE DRAWINGS

FIG. 1 is a side elevational view of a presently preferred embodied form of the invention showing a pedal powered exercycle mower apparatus in accordance with the invention;

FIG. 2 is a top plan view of the exercycle mower apparatus depicted in FIG. 1;

FIG. 3 is an enlarged cross-sectional view of a cutting mechanism with associated gears and flanged bearing units of the exercycle mower apparatus depicted in FIG. 1, and the illustration A thereof depicts the rotational movement directions of the individual components of the grass cutting mechanism;

FIG. 4 is a series of exploded perspective views of components included in the gear system of the cutting mechanism depicted in FIG. 3;

FIG. 5 is a rear elevational view of the exercycle mower apparatus in activated position for stationary operation depicted in FIG. 1 with dotted line 31a.

DESCRIPTION OF THE PREFERRED EMBODIMENTS

Figure 5:
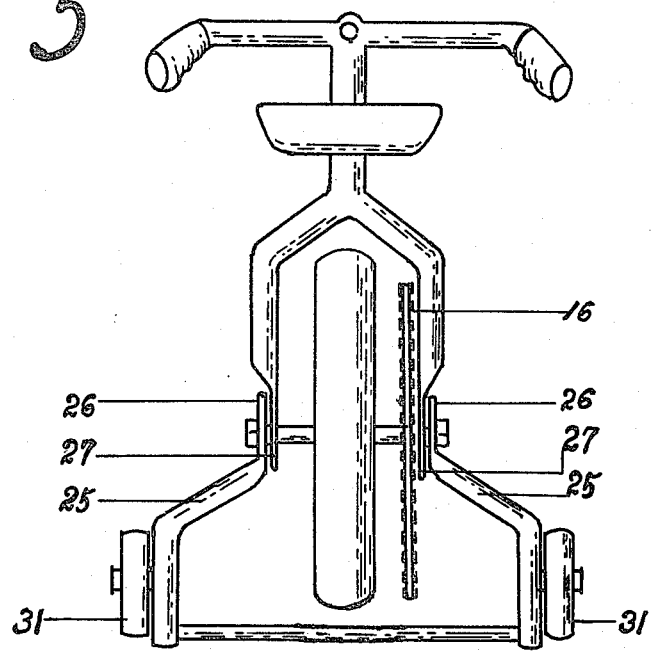

This invention relates to a pedal powered mower apparatus and has particular reference to an apparatus which can be driven by an operator and utilized for the trimming of ground cover such as grass and the like, without the use of fossil fueled engines or electricity. Moreover, the apparatus of the present invention also provides a stationary exercycle apparatus which can be used solely as a source of exercise for the operator.

The inventive apparatus comprises, in combination, a mobile vehicle member having a main supporting frame including a pair of major wheels, front and rear, and an auxiliary frame including a pair of rear minor wheels, left and right; means for cutting ground cover within a path traversed by the member, the means being mounted on the main supporting frame; a pair of foot pedals mounted on the main supporting frame for powering the apparatus by manual rotational movement about a horizontal axis transversed to the longitudinal axis of the main supporting frame; means mounted on the main supporting frame, for apportioning power derived from rotational movement of the foot pedals to drive the means for cutting ground cover and to concurrently drive the apparatus in a forward or rearward direction; and means for applying a spring loaded force on the auxiliary frame to enhance stability of the mobile vehicle member for mowing operations and to cause the pair of rear minor wheels to move in a forward arcuate direction when the rear major wheel of the main supporting frame is elevated from ground level to convert the apparatus to a stationary exercycle.

In one embodied form, the apparatus includes means for converting the apparatus into a stationary exercycle which can be used by the operator for exercise.

Referring now to the drawings, FIGS. 1 and 2 illustrate the general construction of a preferred embodied form of the invention depicting the unique structure of the inventive apparatus in position for mowing operations, and the minor wheels in dotted lines depict the position when it is put to stationary operation for exercise only.

In more detail, the illustrated vehicle member comprises a main supporting frame 1 upon which is a gear housing 2 for retaining an axle shaft 12 and containing a series of gears which translate rotational force applied to a pair of foot pedals 11 into rotational movement of a plurality of cutting blades 20 about a vertical axis transverse to the longitudinal axis of the rectangular frame 1.

The gear housing 2 includes a detachable panel 3 as shown in more detail in FIGS. 3 and 4. A pair of brace plates 4, mounted on the rectangular frame 1, standing in parallel to each other, have open end slots along which three pairs of stud holes 5 are provided (FIG. 4) The open end slots of the brace plates 4 are designed to receive and retain the gear housing 2 in a selected position using one pair of the stud holes 5. To ensure retainment of the gear housing 2 within the open end slots of the brace plates 4, rectangular projections 9 with an elevation as high as the thickness of the brace plate 4 are respectively provided on the gear housing 2 and the detachable panel 3 at their respective centers. The projections 9 include a hole for receiving the flange of bearing 6 and a pair of bolt holes for securement of the flanged bearings 6 thereon as shown in FIGS. 3 and 4.

The bearings 6 are mounted on the projections 9, gear housing 2, and detachable panel 3 by fastening bolts through bolt-holes 7 which are matched with counterparts on projection 9.

One pair of bolt-holes, denoted 8 in FIG. 4 are designed for securing the gear housing unit 2 with the brace plates 4 by matching with a selected pair of the stud holes 5. In one embodied form, the stud holes 5 may be aligned along the open end slots of the brace plates 4 with three holes on each side at one-inch intervals, thereby providing an adjustable grass cutting height for the apparatus. Accordingly, the lowest pair of the stud holes 5 may be positioned for one-inch high grass cutting, the middle pair for two-inch cutting, and the top pair for three-inch cutting.

The axle shaft 12 is installed transversely across the gear housing unit through the respective flanged bearings 6 affixed on both walls of the gear housing box. A spur gear 17 is disposed on the axle shaft 12, and collars 10 are respectively fastened by bolts at the position adjacent to the respective flanged bearing 6. A pair of pedals 11 are mounted on both ends of the axle shaft 12 with a smaller sprocket wheel 14 disposed between the two pedals 11. The sprocket wheel 14 may be preferably integral with the right side pedal 11.

For smooth operation of pinion 18, which is properly meshed with the spur gear 17, a four-bolt flanged bearing 23 is mounted at the bottom of the gear housing 2. A grass cutting blade guard 21 is affixed to the extended portion of the flanged bearing 23 through screw thread, and the Grass-cutting blades 20 are bolted between nuts 24, which are fixed at the end of pinion axis.

A drive chain 16 is thereafter harnessed on the smaller sprocket wheel 14, and wrapped around a second rear sprocket wheel 15, so as to effectively interconnect the two sprocket wheels together.

Figure 6:
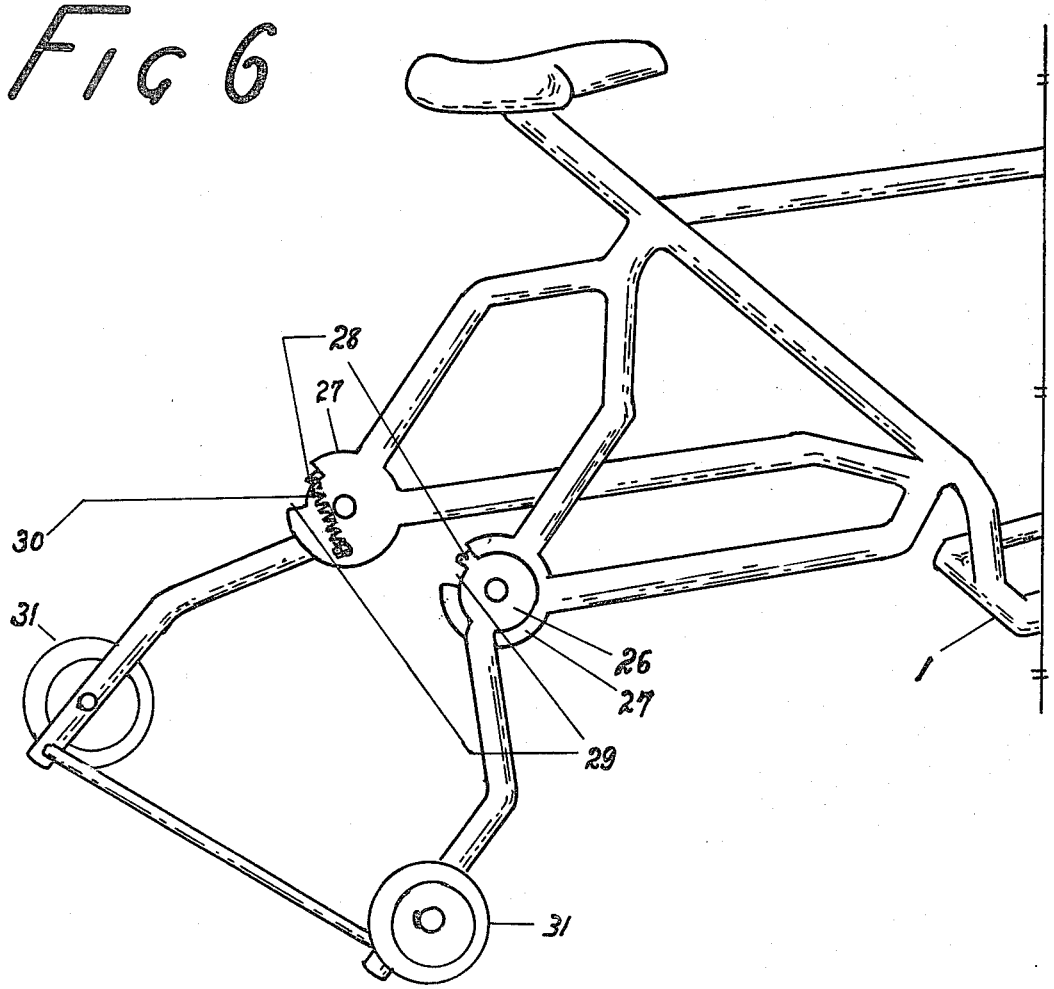
FIG. 6 is a fragmentary perspective side view of the rear portion of the major supporting frame and the auxiliary frame which carries two minor wheels affixed by the fork ends of the said auxiliary frame.

As is most clearly shown in FIGS. 1, 2, 5 and 6, a pair of minor wheels 31 are mounted for rotational movement with axles mounted on the auxiliary frame 25. The two forked ends of the auxiliary frame 25 have circular plates 26 with center holes thereon to join the auxiliary frame with the rear part of the main supporting frame of the present invention.

Right-angle biases 28 of circular plates 26 of the auxiliary frame 25 limit the movement of the auxiliary frame within the crescent cuts 29 of circular plates 27. Springs 30 are harnessed in the crescent cuts 29 by hooking one end of the spring to the right-angle bias 28 and another end of the spring to protruded pieces of the circular plates 27 of the main supporting frame. The springs 30 appropriately provide tension on the minor wheels 31 against the ground during mowing operation in support of equilibrium of the vehicle operation, even under minimal speed proceeding of the vehicle.

In yet another embodied form, the present apparatus may also be used as a stationary exercycle. Accordingly, in this embodiment, the force of the springs 30 are sufficient to maintain the rear fork in an erect position. The right-angle biases 28 of the auxiliary wheel frame 25, are flexible for movement within extent of crescent cuts 29 of the main supporting frame circular plates 27.

For mowing operations, the minor wheels 31 are positioned rearward to contact the ground. The weight of the apparatus maintains the wheels in position against the force of the spring 27. Thus, when the operator applies rotational force to the foot pedals, the driving force of the pedal causes sprocket wheels 14 and 15 to revolve as well as the drive chain 16. The minor wheels 23 are utilized to enhance the stability of the mobile vehicle member. Concurrently, the driving force applied to the pedals causes spur gear 17 and pinion 18 to revolve with a consequent turning of the cutting blades 22.

Preferably, the cutting blades 22 are angled at a 15°-25° angle as shown. Accordingly, the angled blade will revolve about pinion 18 at a rate of from about 300 to about 500 rpm for accomplishing the mowing of ground cover. It has been determined, that the angled cut is desirable in that it requires less cutting force than a right angled cut.

During stationary exercycle riding, the operator will lift the rear of the vehicle member in order to have the auxiliary frame and minor wheel 31 move to a forward position and cause the major rear wheel to be lifted from the ground. In this position, with both the rear major wheel and minor wheel above the ground, the operator may pedal the apparatus for stationary cycle exercise.

In one embodied form, the inventive apparatus will typically be sized with components of the following dimensions. The first sprocket wheel 14 typically will have a diameter of about 3.5 inches with 20 teeth, whereas the rear sprocket wheel 15 will have a diameter of about 18 inches with 112 teeth. The major rear wheel will typically have a diameter of about 20 inches. The diameter of spur gear 17 is typically about 7.5 inches with 45 teeth, and the diameter of the pinion 18 is about 2.5 inches with 15 teeth. Accordingly, one revolution of the spur gear 17 will allow pinion 18 to revolve three times, and one cycle turning of the main rear wheel will have the grass-cutting blades rotating 15 times or more. It has further been determined that about 9/10ths of the applied force to the pedals will be utilized for purposes of the grass-cutting mechanism and about 1/10th of the applied force will be used to cause the mobile member to move the vehicle in a forward or rearward direction.

Accordingly, the unique pedal powered exercycle mower apparatus of the present invention is capable of trimming ground cover, such as grass, clover and the like, while at the same time providing an enjoyable source of exercise for the user, without the use of fossil fueled combustion engines or electricity.

Those skilled in the art will readily appreciate that various modifications can be made to the described embodiment without departing from the spirit and scope of the present invention. Accordingly, this invention is not to be limited, except by construction of the appended claims.

I claim:

1. A pedal powered exercycle mower apparatus for cutting ground cover, said apparatus comprising in combination:
   a mobile vehicle member having a main supporting frame including a pair of major wheels, front and rear, and an auxiliary frame including a pair of rear minor wheels, left and right;
   means for cutting ground cover within a path traversed by said member, said means being mounted on said main supporting frame;
   a pair of foot pedals mounted on said main supporting frame for powering said apparatus by manual rotational movement about a horizontal axis transverse to the longitudinal axis of said main supporting frame;
   means, mounted on said main supporting frame, for apportioning power derived from rotational movement of said foot pedals to drive said means for cutting ground cover and to concurrently drive said apparatus in a forward or rearward direction; and
   means for applying a spring loaded force on said auxiliary frame to enhance stability of said mobile vehicle member for mowing operations and to cause said pair of rear minor wheels to move in a forward arcuate direction when said rear major wheel of said main supporting frame is elevated from ground level, to convert said apparatus to a stationary exercycle.

2. The apparatus as defined in claim 1 wherein said means for apportioning power derived from rotational movement of said foot pedals is a spur gear and associated pinion each having concentric teeth at a peripheral portion which are in beveled arrangement so as to cause simultaneous revolutions when said pair of foot pedals undergoes manual rotational movement.

3. The apparatus as defined in claim 1 wherein said means for cutting ground cover comprises a centrally positioned cutting mechanism provided at a lower portion of said main supporting frame, which is driven be a series of gears translating rotational force from the foot pedals and to rotational movement of a plurality of cutting blades about a vertical axis transverse to the longitudinal axis of the frame.

4. The apparatus as defined in claim 1 wherein said means for cutting ground cover further comprises a first sprocket wheel and a second sprocket wheel interconnected by a drive chain, said first sprocket wheel being relatively smaller than said second rear sprocket wheel for apportioning power derived from rotational movement of said foot pedals.

5. The apparatus as defined in claim 1 wherein said means for cutting ground cover includes a plurality of cutting blades which are oriented at a 15°–25° angle.

* * * * *